(12) United States Patent
Teller

(10) Patent No.: US 8,893,164 B1
(45) Date of Patent: Nov. 18, 2014

(54) AUDIO SYSTEM

(75) Inventor: Eric Teller, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/472,902

(22) Filed: May 16, 2012

(51) Int. Cl.
| | | |
|---|---|---|
| *H04H 60/56* | (2008.01) | |
| *G06Q 30/02* | (2012.01) | |
| *H04N 21/45* | (2011.01) | |
| *H04N 21/81* | (2011.01) | |
| *G06F 21/12* | (2013.01) | |
| *G06F 3/01* | (2006.01) | |
| *H04H 60/33* | (2008.01) | |

(52) U.S. Cl.
CPC ............ *H04N 21/812* (2013.01); *G06F 21/123* (2013.01); *G06Q 30/0252* (2013.01); *G06F 3/012* (2013.01); *G06Q 30/0261* (2013.01); *H04N 21/4524* (2013.01); *H04H 60/56* (2013.01); *H04H 60/33* (2013.01); *G06F 3/013* (2013.01); *H04N 21/4532* (2013.01)
USPC .............................................. 725/12; 725/34

(58) Field of Classification Search
CPC ............ H04N 21/812; H04N 21/4524; H04N 21/4532; G06Q 30/0261; G06Q 30/0252; G06F 3/012; G06F 3/013; G06F 21/123; H04H 60/33; H04H 60/56
USPC .......................................................... 725/12
See application file for complete search history.

(56) References Cited

U.S. PATENT DOCUMENTS

| | | | | |
|---|---|---|---|---|
| 5,511,000 | A * | 4/1996 | Kaloi et al. .................... 704/201 |
| 6,195,640 | B1 * | 2/2001 | Mullaly et al. ................ 704/260 |
| 6,307,526 | B1 * | 10/2001 | Mann ................................. 345/8 |
| 7,736,000 | B2 * | 6/2010 | Enriquez et al. .............. 351/210 |
| 8,196,064 | B2 * | 6/2012 | Krzyzanowski et al. ...... 715/844 |
| 2002/0085843 | A1 * | 7/2002 | Mann ............................. 396/374 |
| 2005/0108092 | A1 * | 5/2005 | Campbell et al. ................ 705/14 |
| 2006/0256133 | A1 * | 11/2006 | Rosenberg ..................... 345/619 |
| 2007/0050253 | A1 * | 3/2007 | Biggs et al. ...................... 705/14 |
| 2007/0165964 | A1 * | 7/2007 | Wolf et al. ..................... 382/276 |
| 2008/0022569 | A1 * | 1/2008 | Winn .............................. 40/457 |
| 2008/0147488 | A1 * | 6/2008 | Tunick et al. ................... 705/10 |
| 2010/0053555 | A1 * | 3/2010 | Enriquez et al. .............. 351/210 |
| 2010/0080418 | A1 * | 4/2010 | Ito ................................. 382/103 |
| 2011/0161163 | A1 * | 6/2011 | Carlson et al. ............. 705/14.44 |
| 2011/0213664 | A1 * | 9/2011 | Osterhout et al. ......... 705/14.58 |
| 2011/0234475 | A1 | 9/2011 | Endo |
| 2011/0255010 | A1 * | 10/2011 | Sakai et al. ................... 348/730 |
| 2011/0292181 | A1 * | 12/2011 | Acharya et al. ................ 348/47 |

(Continued)

OTHER PUBLICATIONS

Hartberger, R. H&C Coffee History. Quality Coffee Company. 2006. Web. Mar. 4, 2010. <http://www.qualitycoffee.com/hchistory.htm>.
*

(Continued)

*Primary Examiner* — Nasser Goodarzi
*Assistant Examiner* — Michael B Pierorazio
(74) *Attorney, Agent, or Firm* — McDonnell Boehnen Hulbert & Berghoff LLP

(57) ABSTRACT

Methods and systems for providing audio information based on gaze information are described. In an example, a computing device may be configured to receive gaze information indicative of a wearer-view associated with the computing device. Based on the gaze information, the computing device may be configured to determine content displayed in the wearer-view. Further, the computing device may be configured to determine audio information relating to the content and cause an audio stream associated with the audio information to be played at the computing device.

18 Claims, 8 Drawing Sheets

(56) References Cited

U.S. PATENT DOCUMENTS

| | | | | |
|---|---|---|---|---|
| 2012/0075168 | A1* | 3/2012 | Osterhout et al. | 345/8 |
| 2012/0194418 | A1* | 8/2012 | Osterhout et al. | 345/156 |
| 2012/0194419 | A1* | 8/2012 | Osterhout et al. | 345/156 |
| 2012/0194420 | A1* | 8/2012 | Osterhout et al. | 345/156 |
| 2012/0194549 | A1* | 8/2012 | Osterhout et al. | 345/633 |
| 2012/0194550 | A1* | 8/2012 | Osterhout et al. | 345/633 |
| 2012/0194551 | A1* | 8/2012 | Osterhout et al. | 345/633 |
| 2012/0194552 | A1* | 8/2012 | Osterhout et al. | 345/633 |
| 2012/0194553 | A1* | 8/2012 | Osterhout et al. | 345/633 |
| 2012/0200488 | A1* | 8/2012 | Osterhout et al. | 345/156 |
| 2012/0200499 | A1* | 8/2012 | Osterhout et al. | 345/158 |
| 2012/0200601 | A1* | 8/2012 | Osterhout et al. | 345/633 |
| 2012/0206322 | A1* | 8/2012 | Osterhout et al. | 345/8 |
| 2012/0206323 | A1* | 8/2012 | Osterhout et al. | 345/8 |
| 2012/0206334 | A1* | 8/2012 | Osterhout et al. | 345/156 |
| 2012/0206335 | A1* | 8/2012 | Osterhout et al. | 345/156 |
| 2012/0206485 | A1* | 8/2012 | Osterhout et al. | 345/633 |
| 2012/0212414 | A1* | 8/2012 | Osterhout et al. | 345/158 |
| 2012/0212484 | A1* | 8/2012 | Haddick et al. | 345/419 |
| 2012/0212499 | A1* | 8/2012 | Haddick et al. | 345/589 |
| 2012/0229909 | A1 | 9/2012 | Clavin et al. | |
| 2012/0300061 | A1 | 11/2012 | Osman et al. | |
| 2013/0106674 | A1 | 5/2013 | Wheeler et al. | |

OTHER PUBLICATIONS

Loeffler, W. 100 years later, neon still glowing bright. McClatchy—Tribune Business News. Nov. 9, 2008. Web. Dec. 5, 2013 <http://search.proquest.com/docview/456859242?accountid=14753>.*

Mackie, John. "Signs from Vancouver's Neon Age Stand the Test of Time." The Vancouver Sun: 0. Oct. 6, 2003. ProQuest. Web. Dec. 5, 2013 <http://search.proquest.com/docview/242386453?accountid=14753>.*

Mullen, M. Heinz to Light Up the Night With Refurbished Ketchup Sign. Heinz Online Newsroom. Nov. 5, 2007. Business Wire. Web. Dec. 5, 2013. <http://news.heinz.com/press-release/general/heinz-light-night-refurbishedketchup-sign>.*

Unpublished U.S. Appl. No. 13/292,893, filed Nov. 9, 2011 entitled "Valuing Advertisement Space Based on Gaze Data".

Unpublished U.S. Appl. No. 13/292,898, filed Nov. 9, 2011 entitled "Marketplace for Advertising Space Using Gaze-Data Valuation".

Unpublished U.S. Appl. No. 13/292,904, filed Nov. 9, 2011 entitled "Real-Time Targeting of Advertisements Based on Gaze-Direction".

Unpublished U.S. Appl. No. 13/292,909, filed Nov. 9, 2011 entitled "Individualized Gaze Valuation Based on Gaze Data".

Unpublished U.S. Appl. No. 13/428,964, filed Mar. 23, 2012 entitled "Gaze-Data Based Targeting of Advertising in Wearable Display".

Unpublished U.S. Appl. No. 13/474,970, filed May 18, 2012 entitled "Real-Time Trading of Gaze-Based Advertisement Opportunities".

Unpublished U.S. Appl. No. 13/428,979, filed Mar. 23, 2012 entitled "Feedback to Inform of Learnt Advertising Preferences".

Unpublished U.S. Appl. No. 13/478,218, filed May 23, 2012 entitled "Removal of Biometric Data from Gaze Data".

Unpublished U.S. Appl. No. 13/428,991, filed Mar. 23, 2012 entitled "Placement of Advertisements in See-Through Display of a Head-Mountable Device".

Unpublished U.S. Appl. No. 13/419,783, filed Mar. 14, 2012 entitled "Distributing Advertisements in a Wearable Display".

Starner, Thad; "The Challenges of Wearable Computing: Part 1"; Georgia Institute of Technology; IEEE; Jul.-Aug. 2001.

Starner, Thad; "The Challenges of Wearable Computing: Part 2"; Georgia Institute of Technology; IEEE; Jul.-Aug. 2001.

* cited by examiner

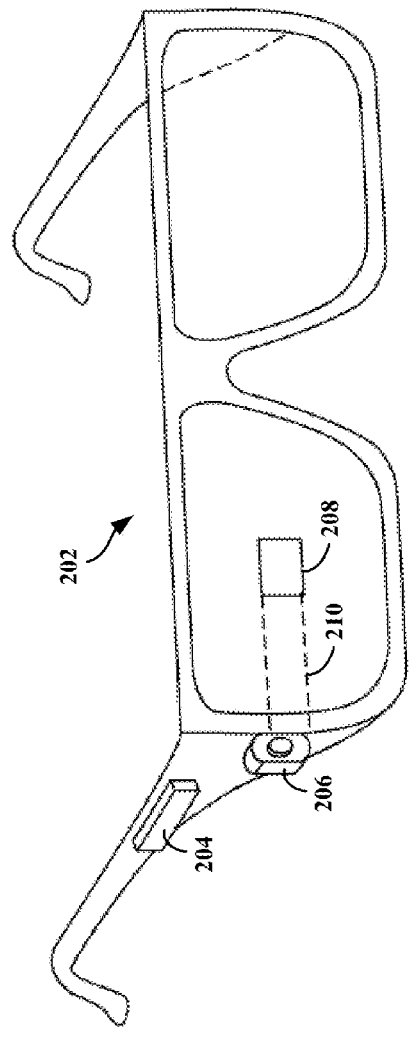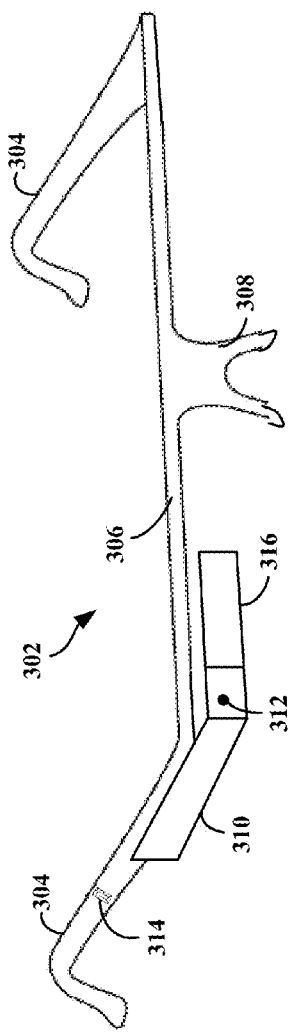

US 8,893,164 B1

AUDIO SYSTEM

BACKGROUND

Augmented reality generally refers to a real-time view of a real-world environment that is augmented with additional content. A user may experience augmented reality through the use of a computing device. The computing device may be configured to generate the real-time view of the environment, either by allowing a user to directly view the environment or by allowing the user to indirectly view the environment by generating and displaying a real-time representation of the environment to be viewed by the user.

The additional content may include, for example, a user-interface through which the user may interact with the computing device. The computing device may overlay the view of the environment with the user-interface such that the user sees the view of the environment and the user-interface at the same time.

SUMMARY

The present application discloses systems and methods for providing audio information based on gaze information. In one aspect, a method is described. The method may comprise receiving, at a computing device, gaze information indicative of a wearer-view associated with the computing device. The method also may comprise determining, based on the gaze information, a video advertisement in a physical advertisement space in the wearer-view. The method further may comprise determining an audio advertisement relating to the video advertisement. The method also may comprise causing the audio advertisement to be played at the computing device.

In still another aspect, a system is described. The system may comprise an eye-tracking system. The system also may comprise a computing device in communication with the eye-tracking system. The computing device may be configured to receive, from the eye-tracking system, gaze information indicative of a wearer-view associated with the computing device. The computing device also may be configured to determine, based on the gaze information, content depicted on a display device in the wearer-view. The computing device further may be configured to determine audio information relating to the content. The computing device also may be configured to cause an audio stream associated with the audio information to be played at the computing device.

In another aspect, a non-transitory computer readable medium having stored thereon instructions executable by a computing device to cause the computing device to perform functions is described. The functions may comprise receiving, at a computing device, gaze information indicative of a wearer-view associated with the computing device. The functions also may comprise determining, based on the gaze information, a video advertisement in a physical advertisement space in the wearer-view. The functions further may comprise determining an audio advertisement relating to the video advertisement. The function also may comprise causing the audio advertisement to be played at the computing device.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 2 illustrates another example system for receiving, transmitting, and displaying data, in accordance with an embodiment.

FIG. 3 illustrates another example system for receiving, transmitting, and displaying data, in accordance with an embodiment.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

In an example, a computing device may be configured to receive gaze information indicative of a wearer-view associated with the computing device. Based on the gaze information, the computing device may be configured to determine a video advertisement in a physical advertisement space in the wearer-view. Further, the computing device may be configured to determine an audio advertisement relating to the video advertisement and cause the audio advertisement to be played at the computing device.

In another example, the computing device may be configured to determine, based on the gaze information, content depicted on a display device in the wearer-view. Also, the computing device may be configured to determine audio information relating to the content and cause an audio stream associated with the audio information to be played at the computing device. The content may include one or more of a video, an interactive media element, a game, and a graphical user interface, for example. In an example, the content may be displayed as multiple items on the display device, and each item of the multiple items may have an associated audio stream. In another example, respective contents may be displayed on respective display devices, and the computing device may be configured, based on the gaze information indicating which respective content is gazed at, to cause a given audio stream corresponding to the respective content to be played at the computing device.

In still another example, the computing device may cause an audio stream that is thematically related to what a user is looking at or circumstances of the user. As an example, the user may close his eyes and, accordingly, the computing device may cause a stream of soft music to play at the computing device. In another example, the user may be looking at text (e.g., an article), and the computing device may stop playing any audio streams. In still another example, the user may be driving a car in traffic, and the computing device may cause white noise sound to play at the computing device to reduce perceived loudness of the traffic. Other examples are possible.

Figure 1A:
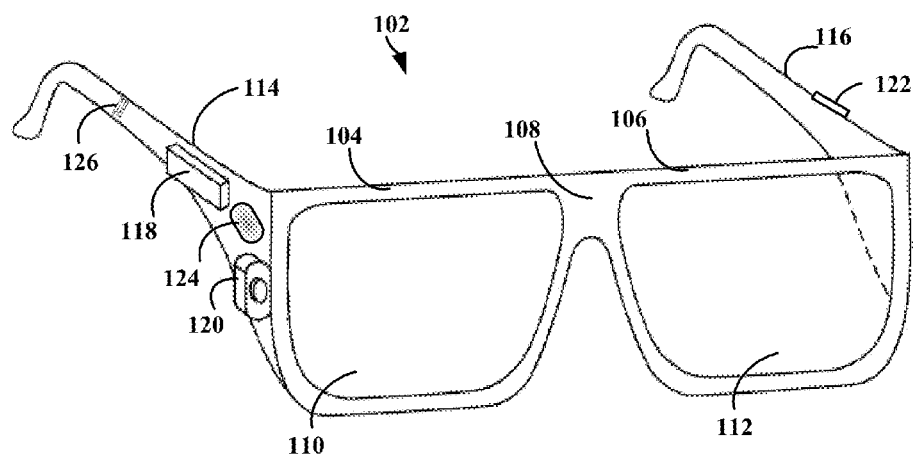
FIG. 1A illustrates an example system for receiving, transmitting, and displaying data, in accordance with an embodiment.

Referring now to the Figures, FIG. 1A illustrates an example system for receiving, transmitting, and displaying data, in accordance with an embodiment. The system is shown as a wearable computing device in a form of a head-mounted device 102 as an example. Other types of wearable computing devices could additionally or alternatively be used. As illustrated in FIG. 1A, the head-mounted device 102 may include frame elements including lens-frames 104, 106 and a center frame support 108, lens elements 110, 112, and extending side-arms 114, 116. The center frame support 108 and the extending side-arms 114, 116 are configured to secure the head-mounted device 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mounted device 102. Other materials are possible as well.

One or more of each of the lens elements 110, 112 may be formed of any material that can suitably display a projected image or graphic (e.g., a user-interface). Each of the lens elements 110, 112 may also be sufficiently transparent to allow a user to see through the lens element. Combining these two features of the lens elements 110, 112 may facilitate an augmented reality or heads-up display where the projected image or graphic is superimposed over a real-world view as perceived by the user through the lens elements 110, 112.

The extending side-arms 114, 116 may each be projections that extend away from the lens-frames 104, 106, respectively, and may be positioned behind a user's ears to secure the head-mounted device to the user. In some examples, the extending side-arms 114, 116 may further secure the head-mounted device 102 to the user by extending around a rear portion of the user's head. Additionally or alternatively, for example, the head-mounted device 102 may connect to or be affixed within a head-mounted helmet structure. Other possibilities exist as well.

The head-mounted device 102 may also include an on-board computing system 118, a video camera 120, at least one sensor 122, a speaker 123, a finger-operable touch pad 124, and a button 126. The on-board computing system 118 is shown to be positioned on the extending side-arm 114 of the head-mounted device 102; however, the on-board computing system 118 may be provided on other parts of the head-mounted device 102 or may be positioned remote from the head-mounted device 102 (e.g., the on-board computing system 118 could be connected via a wired or wireless connection to the head-mounted device 102). The on-board computing system 118 may include a processor and data storage, for example, among other components. The on-board computing system 118 may be configured to receive and analyze data from the video camera 120, the at least one sensor 122, and the finger-operable touch pad 124 (and possibly from other user-input devices, user-interfaces, or both) and generate images and graphics for output by the lens elements 110 and 112. The on-board computing system 118 may additionally include a microphone for user input (not shown).

The video camera 120 is shown positioned on the extending side-arm 114 of the head-mounted device 102; however, the video camera 120 may be provided on other parts of the head-mounted device 102. The video camera 120 may be configured to capture images at various resolutions or at different frame rates. Video cameras with a small form-factor, such as those used in cell phones or webcams, for example, may be incorporated into an example of the head-mounted device 102.

Further, although FIG. 1A illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where images and/or graphics appear to interact with the real-world view perceived by the user.

The at least one sensor 122 is shown on the extending side-arm 116 of the head-mounted device 102; however, the at least one sensor 122 may be positioned on other parts of the head-mounted device 102. The sensor at least one 122 may include one or more movement sensors, such as one or both of a gyroscope or an accelerometer, for example. Other sensing devices may be included within, or in addition to, the at least one sensor 122, or other sensing functions may be performed by the at least one sensor 122.

The speaker 123 is shown on the extending side-arm 114 of the head-mounted device 102; however, the speaker 123 may be positioned on other parts of the head-mounted device 102. The on-board computing system 118 may be configured to cause an audio stream to be played through the speaker 123, for example. Although one speaker 123 is shown, more than one speaker can be coupled to the head-mounted device 102.

The finger-operable touch pad 124 is shown on the extending side-arm 114 of the head-mounted device 102; however, the finger-operable touch pad 124 may be positioned on other parts of the head-mounted device 102. Also, more than one finger-operable touch pad may be present on the head-mounted device 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel and/or planar to a surface of the finger-operable touch pad 124, in a direction normal to the surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function. For example, the finger operable touch pad may include a button with various functionalities.

The button 126 is shown on the extending arm 114 of the head-mounted device 102; however, the button 126 may be positioned on other parts of the head-mounted device 102. Also, more than one button such as the button 126 may be present on the head-mounted device 126.

Figure 1B:
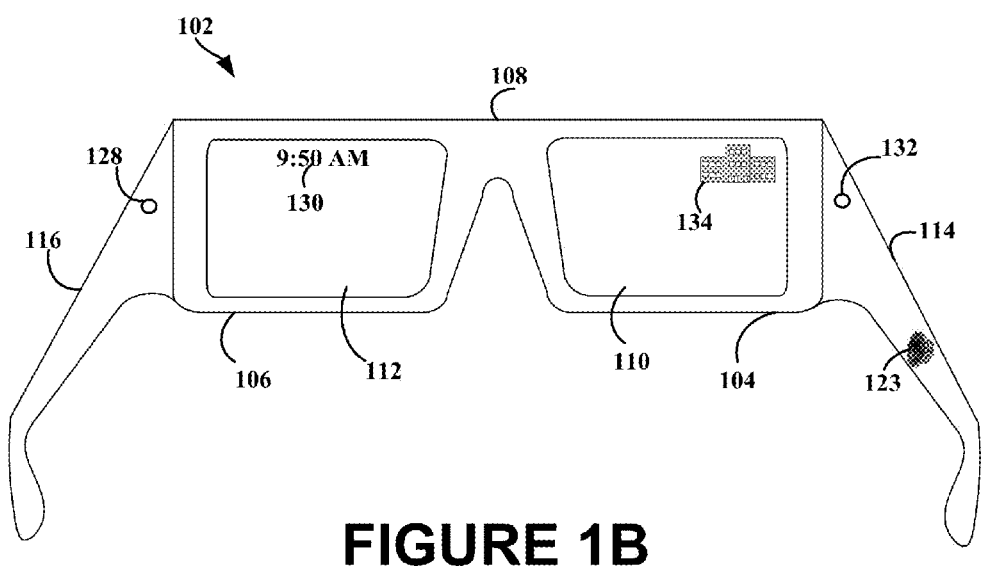
FIG. 1B illustrates an alternate view of the system illustrated in FIG. 1A, in accordance with an embodiment.

FIG. 1B illustrates an alternate view of the system illustrated in FIG. 1A, in accordance with an example. As shown in FIG. 1B, the lens elements 110, 112 may act as display elements. The head-mounted device 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system. Further, in some examples, the lens elements 110, 112 may include a coating that reflects the light projected onto them from the projectors 128, 132.

In alternative examples, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or light emitting diode (LED) source and scanning system could be used to draw a raster display directly onto the retina of one or more of the user's eyes. In these examples, a reflective coating on the lenses 110, 112 may be omitted. Other possibilities exist as well.

FIG. 2 illustrates another example system for receiving, transmitting, and displaying data, in accordance with an embodiment. The system is shown in the form of a wearable computing device 202. The wearable computing device 202 may include frame elements, side-arms, and lens elements, which may be similar to those described above in connection with FIGS. 1A and 1B. The wearable computing device 202 may additionally include an on-board computing system 204 and a video camera 206, which may also be similar to those described above in connection with FIGS. 1A and 1B. The video camera 206 is shown mounted on a frame of the wearable computing device 202; however, the video camera 206 may be mounted at other positions as well.

As shown in FIG. 2, the wearable computing device 202 may include a single display 208 which may be coupled to the device. The display 208 may be similar to the display described above in connection with FIGS. 1A and 1B. The display 208 may be formed on one of the lens elements of the wearable computing device 202, and may be configured to overlay images and/or graphics (e.g., a user-interface) on the user's view of the physical world. The display 208 is shown to be provided in a center of a lens of the wearable computing device 202; however, the display 208 may be provided in other positions. The display 208 is controllable via the computing system 204 that is coupled to the display 208 via an optical waveguide 210.

FIG. 3 illustrates another example system for receiving, transmitting, and displaying data, in accordance with an embodiment. The system is shown in the form of a wearable computing device 302. The wearable computing device 302 may include side-arms 304, a center frame support 306, and a bridge portion with nosepiece 308. In the example shown in FIG. 3, the center frame support 306 connects the side-arms 304. The wearable computing device 302 does not include lens-frames containing lens elements. The wearable computing device 302 may additionally include an on-board computing system 310 and a video camera 312, which may be similar to those described above in connection with FIGS. 1A and 1B. Additionally, the wearable computing device 302 may include a button 314 that, for example, may include a multi-state button with multiple corresponding functions.

The wearable computing device 302 may include a single lens element 316 that may be coupled to one of the side-arms 304 or the center frame support 306. The lens element 316 may include a display, which may be similar to the display described above in connection with FIGS. 1A and 1B, and may be configured to overlay images and/or graphics (e.g., a user-interface, menus, etc.) upon the user's view of the physical world. In one example, the single lens element 316 may be coupled to a side of the extending side-arm 304. The single lens element 316 may be positioned in front of or proximate to a user's eye when the wearable computing device 302 is worn by a user. For example, the single lens element 316 may be positioned below the center frame support 306, as shown in FIG. 3.

In some examples, a wearable computing device (such as any of the wearable computing devices 102, 202, and 302 described above) may be configured to operate in a computer network structure. To this end, the wearable computing device may be configured to connect to one or more remote devices using a communication link or links.

The remote device(s) may be any type of computing device or transmitter, such as, for example, a laptop computer, a mobile telephone, or tablet computing device, etc., that is configured to transmit data to the wearable computing device. The wearable computing device may be configured to receive the data and, in some cases, provide a display that is based at least in part on the data.

The remote device(s) and the wearable computing device may each include hardware to enable the communication link(s), such as processors, transmitters, receivers, antennas, etc. The communication link(s) may be a wired or a wireless connection. For example, the communication link may be a wired serial bus, such as a universal serial bus or a parallel bus, among other connections. As another example, the communication link may be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Either of such a wired and/or wireless connection may be a proprietary connection as well. The remote device(s) may be accessible via the Internet and may include a computing cluster associated with a particular web service (e.g., social-networking, photo sharing, address book, etc.).

As described above in connection with FIGS. 1-3, an example wearable computing device may include, or may otherwise be communicatively coupled to, a computing system, such as computing system 118, computing system 204, or computing system 310.

Figure 4:
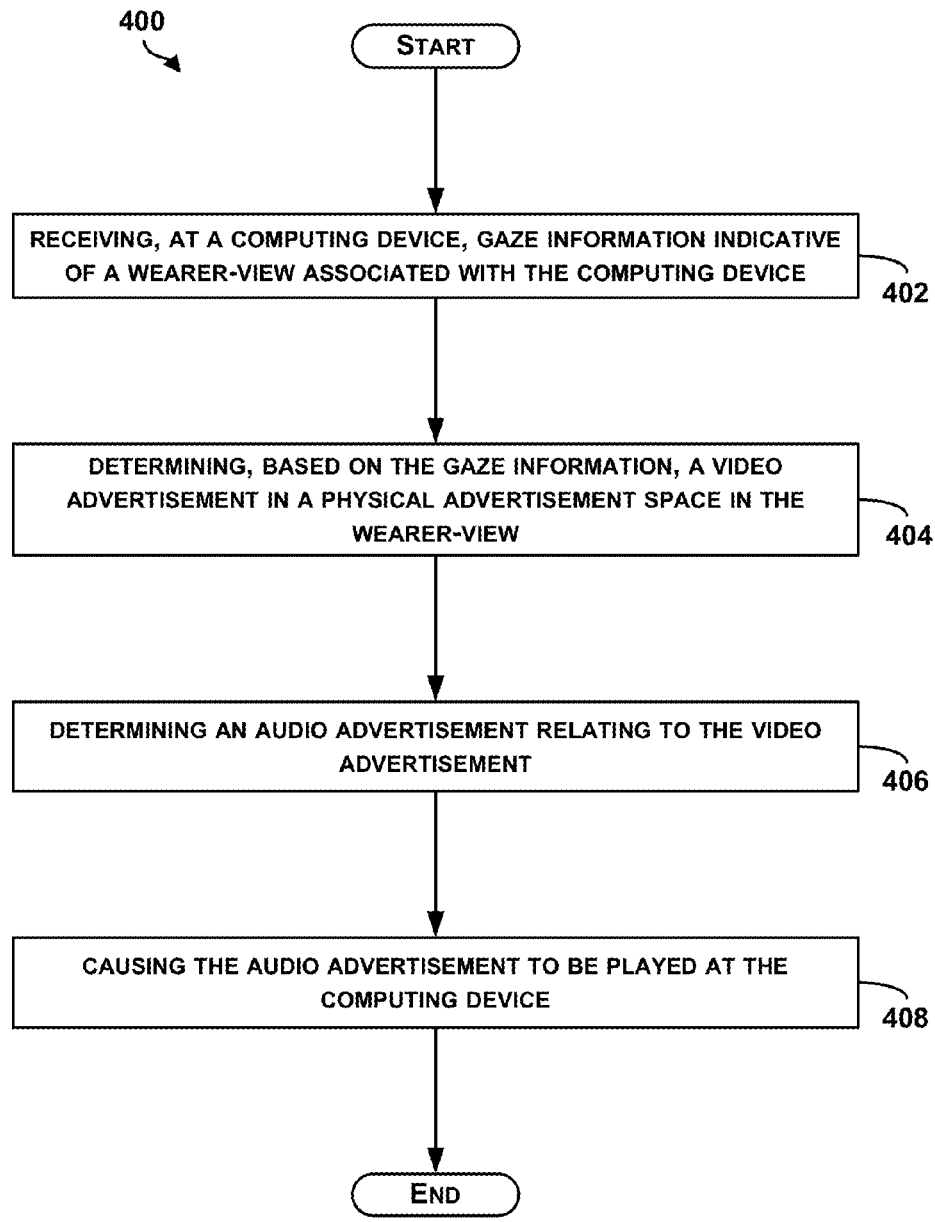
FIG. 4 is a flowchart of an example method for providing audio information based on gaze information, in accordance with an embodiment.
Figure 5:
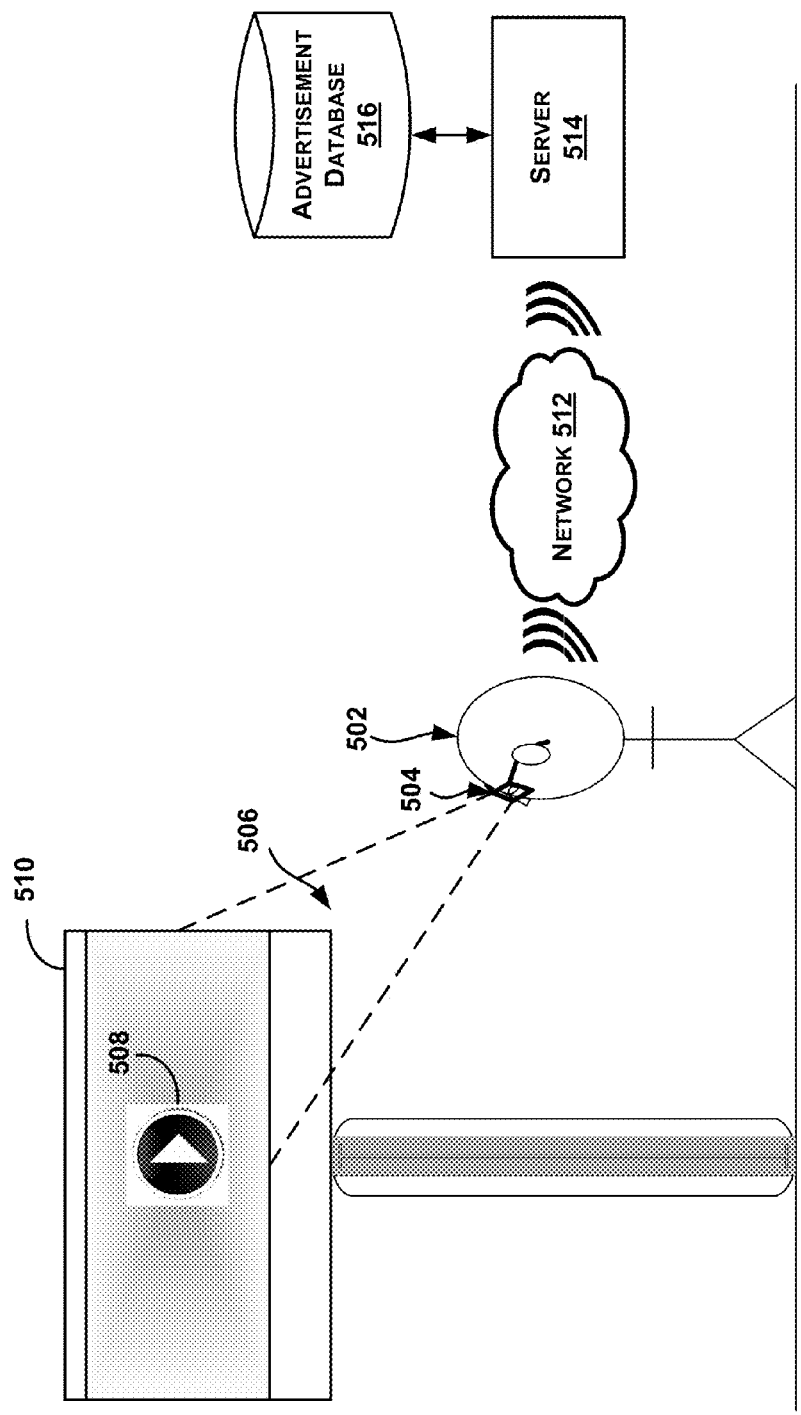
FIG. 5 illustrates an example implementation for providing audio information based on gaze information, in accordance with an embodiment.

FIG. 4 is a flow chart of an example method 400 for providing audio information based on gaze information, in accordance with an embodiment. FIG. 5 illustrates an example implementation for providing audio information based on gaze information, in accordance with an embodiment, to illustrate the method 400. FIGS. 4 and 5 will be described together.

The method 400 may include one or more operations, functions, or actions as illustrated by one or more of blocks 402-408. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation In addition, for the method 400 and other processes and methods disclosed herein, the flowchart shows functionality and operation of one possible implementation of present examples. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 400 and other processes and methods disclosed herein, each block in FIG. 4 may represent circuitry that is wired to perform the specific logical functions in the process.

At block 402, the method 400 includes receiving, at a computing device, gaze information indicative of a wearer-view associated with the computing device. In an example, the computing device may include a wearable computing device, such as the wearable computing devices described in FIGS. 1A-3. In another example, the computing device may include a server or other remote device (e.g., mobile phone) in communication with the wearable computing device. In the description herein, the computing device may refer to the wearable computing device or the server in communication with the wearable computing device.

In an example, the computing device may be in communication with an eye-tracking system. The eye-tracking system may include hardware such as an infrared camera and at least one infrared light source. The infrared camera may be utilized by the eye-tracking system to capture images of an eye of a user. The images may include either video images or still images or both. The images obtained by the infrared camera regarding the eye of the user may help determine where the user may be looking within a given field of view, for instance, by ascertaining a location of an eye pupil of the user. As another example, the eye-tracking system may include a low power reflectivity sensor system that detects where the eye pupil may be pointing or gazing. The low power reflectivity sensor system may include an infrared (IR) light emitting diode (LED) and photo detector that may be directed at the eye pupil. When the eye pupil gazes at the IR LED, the amount of IR light reflected back to the photo detector may drop, for example. The computing device, thus, may be configured to receive gaze information from the eye-tracking system and to make a determination regarding a direction of a gaze of the user, also termed a gaze axis. The computing device, thus, may be configured to determine a wearer-view based on the gaze information; and further may be configured to cause an image-capture device (e.g., a camera) coupled to the computing device to capture an image or a video of the determined wearer-view.

In the example where the computing device includes the wearable computing device, the image or the video may be captured from a point-of-view (POV) of the wearable computing device by a forward-facing camera coupled to the wearable computing device, for example. In one example, the forward-facing camera may be coupled to a head-mounted display (HMD) coupled to the wearable computing device. In this example, the image or the video captured by the forward-facing camera may provide an indication of what the user of the wearable computing device or the HMD may be looking at.

At block 404, the method 400 includes determining, based on the gaze information, a video advertisement in a physical advertisement space in the wearer-view. FIG. 5 illustrates a user 502 wearing a wearable computing device 504 (e.g., any of the wearable computing devices described in FIGS. 1A-3). The wearable computing device 504 may be configured to receive gaze information indicative of a wearer-view 506 associated with the wearable computing device 504. The gaze information, for example, may include an image or a video of the wearer-view 506, captured by an image-capture device coupled to the wearable computing device 504. As an example, the image-capture device may include a camera such as the camera 120 in FIG. 1A, or the camera 206 in FIG. 2, or the camera 312 in FIG. 3 or any other image-capture device coupled to a respective wearable computing device.

In an example, based on the gaze information (e.g., the image or the video), the wearable computing device 504 may be configured to determine that the wearer-view 506 includes a video advertisement 508 displayed in a physical advertisement space 510. The physical advertisement space 510, for example, may include a billboard, an advertising screen in a mall, or any other configuration of physical advertising space where a given video advertisement is displayed.

In one example, the wearable computing device 504 may be configured to use image recognition techniques known in the art to identify the video advertisement 508 based on the gaze information (e.g., determine the video advertisement 508 depicted in the image or the video). In another example, the wearable computing device may be configured to communicate the gaze information through a network 512 (wired or wireless) to a server 514. In this example, the server 514 may be configured to receive the gaze information and may be configured to determine or identify the video advertisement 508 in the physical advertisement space 510, based on the gaze information.

In still another example, the wearable computing device 504 may be configured to process the gaze information and generate a visual search query based on the video advertisement 508. The visual search query, for example, may include the image or a query image extracted from the image or a query video extracted from the video included in the gaze information in addition to metadata associated with the video advertisement 508 (e.g., features, colors, categorization, product or entity advertised, etc.). The wearable computing device 504 may be configured to communicate the visual search query through the network 512 to the server 514; and, in response to receiving the visual search query, the server 514 may be configured to recognize or identify the video advertisement 508. As an example, the server 514 may be configured to access or be in communication with an advertisement database 516 that may include a repository of video advertisements. The advertisement database 516, for example, may index reference advertisements to compare the received gaze information and/or visual search query with stored information so as to identify the video advertisement 508. The server 514, thus, may be configured to communicate with the advertisement database 516, based on the gaze information and/or the visual search query, to determine the associated video advertisement 508.

Referring back to FIG. 4, at block 406, the method 400 includes determining an audio advertisement relating to the video advertisement. The video advertisement may be a portion of a media advertisement that also includes a corresponding audio advertisement. As an example, the video advertisement may include a video of a vehicle being advertised showing exterior and interior details of the vehicle; and, in this example, the audio advertisement may include an audio commentary that explains or defines the details in the video advertisement. The computing device may be configured to determine the audio advertisement relating to the determined video advertisement.

For example, in FIG. 5, the wearable computing device 504, upon receiving the gaze information and determining the video advertisement 508, may be configured to determine the audio advertisement corresponding to the video advertisement 508. In another example, the server 514, upon receiving the gaze information or the visual search query and determining the video advertisement 508, may be configured, through access or communication with the advertisement database 516, to determine the audio advertisement corresponding to the video advertisement 508.

Referring back to FIG. 4, at block 408, the method 400 includes causing the audio advertisement to be played at the computing device. Referring to FIG. 5, either the wearable computing device 504 or the server 514 may be configured to cause the audio advertisement to be played at the wearable computing device 504. In one example, the wearable computing device 504 may be configured to receive an audio file or an audio stream of the audio advertisement from the server 514 through the network 512; and may be configured to cause a software application to play the audio stream by executing instructions stored on a memory coupled to the wearable computing device 504, for example. In this example, the wearable computing device 504 may be configured to cause the audio stream to play through one or more speakers (e.g., the speaker 123 illustrated in FIG. 1B) that may be coupled to the wearable computing device 504.

In one example, the audio advertisement may be synchronized to the video advertisement 508. For example, the server 514 may be configured to send the audio advertisement and a starting point or starting time in the audio advertisement to start at which in order to be in synchrony with the video advertisement 508. In another example, the audio advertisement may not be synchronized to the video advertisement 508 and may start playing at a beginning of the audio advertisement. In still another example, the audio advertisement determined and caused to be played by the computing device may be a portion of a longer audio advertisement.

In an example, the computing device (i.e., either the wearable computing device 504 or the server 514) may be configured to determine, based on the gaze information, an amount of time during which the video advertisement 508 is gazed at. The computing device may be configured to compare the amount of time to a predetermined threshold time period and may be configured to cause the audio advertisement to be played at the computing device in response to determining that the amount of time exceeds the predetermined threshold time period, which may be indicative of the user 502 heeding or paying attention to the video advertisement 508 and being interested in hearing the audio advertisement relating to the video advertisement 508. In another example, the computing device may be configured to determine a focus metric, which may be a function of the amount of time during which the video advertisement is gazed at. The focus metric may be indicative of a level of focus or interest of the user 502 in the video advertisement 508. The computing device may be configured to cause the audio advertisement to be played at the computing device based on a comparison of the focus metric to a predetermined focus threshold.

In some examples, the computing device may be configured to determine, based on the gaze information, a change in the wearer-view 506. For example, the gaze information may indicate that the user 502 disregarded (e.g., looked away from) the video advertisement 508. Accordingly, the computing device may be configured to stop playing the audio advertisement. Further, based on the gaze information, the computing device may be configured to determine that the user 502 re-focused on the video advertisement 508 and, accordingly, may be configured to cause the audio advertisement to resume playing at the computing device.

In the examples described above, the video advertisement 508 is shown in the physical advertisement space 510, which can be a billboard or any screen that the user 502 may be looking at. Alternatively or additionally, the computing device may be configured to cause a video portion of an advertisement to be displayed in an advertisement space on a head-mounted display (HMD) coupled to the computing device. The computing device may be configured to receive gaze information from an eye-tracking system coupled to the computing device and determine that that the video portion is gazed at. Further, the computing device may be configured to cause an audio portion of the advertisement to be played at the computing device.

Figure 6:
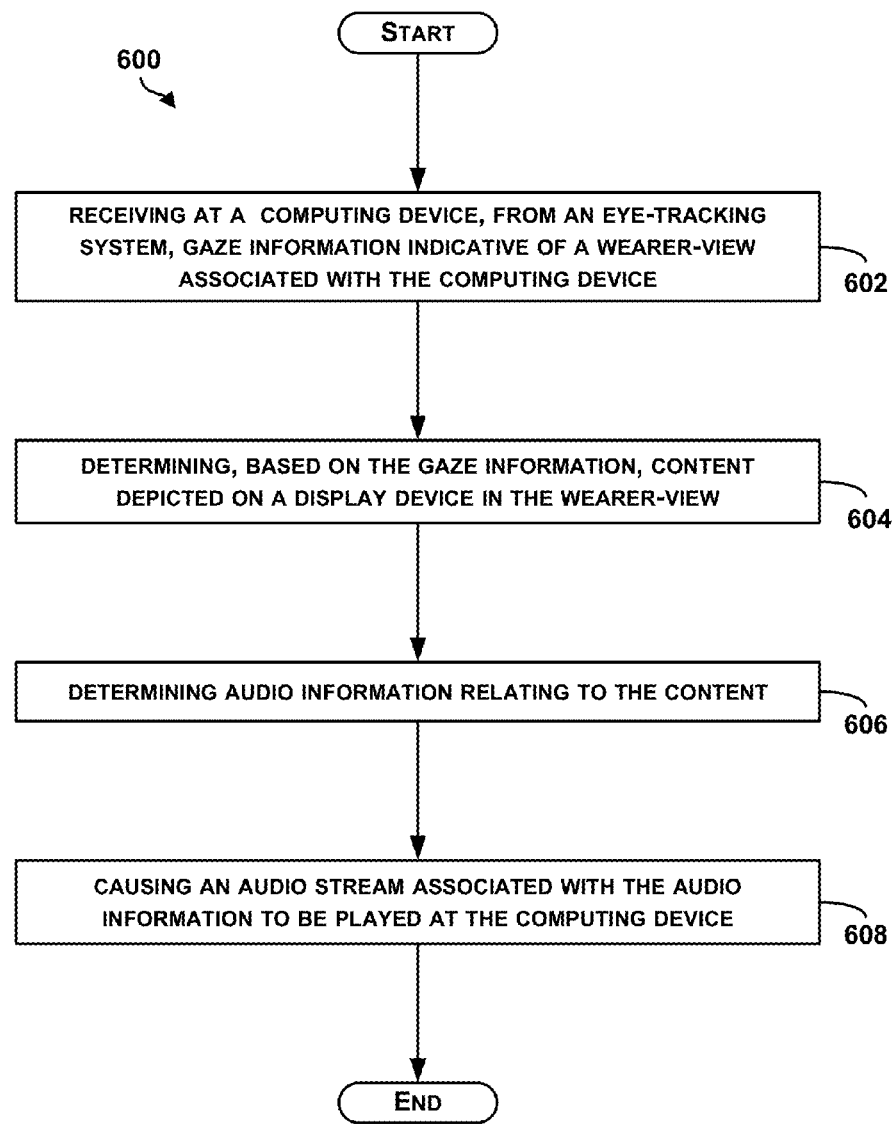
FIG. 6 is a flowchart of another example method for providing audio information based on gaze information, in accordance with an embodiment.
Figure 7:
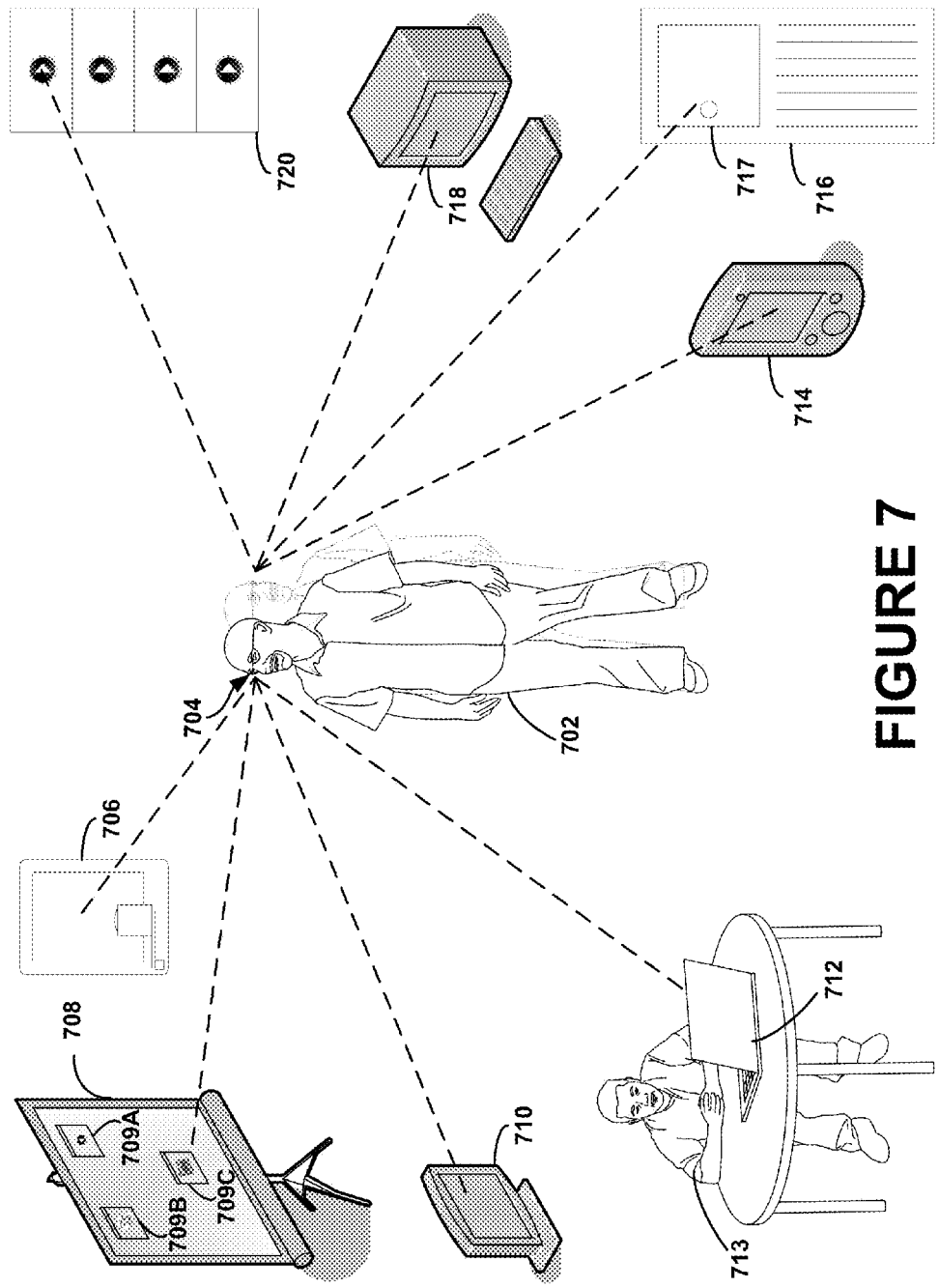
FIG. 7 illustrates aspects of example implementations for providing audio information based on gaze information, in accordance with an embodiment.

FIG. 6 is a flowchart of another example method for providing audio information based on gaze information, in accordance with an embodiment. FIG. 7 illustrates aspects of example implementations for providing audio information based on gaze information, in accordance with an embodiment, to illustrate the method 600. FIGS. 6 and 7 will be described together.

The method 600 may include one or more operations, functions, or actions as illustrated by one or more of blocks 602-608. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 602, the method 600 includes receiving at a computing device, from an eye-tracking system, gaze information indicative of a wearer-view associated with the computing device. In an example, the computing device may include a wearable computing device, such as the wearable computing devices described in FIGS. 1A-3. In another example, the computing device may include a server in communication with the wearable computing device. In the description herein, the computing device may refer to the wearable computing device or the server in communication with the wearable computing device.

The computing device may be coupled to an eye-tracking system. The computing device may be configured to determine a wearer-view based on gaze information received from the eye-tracking system and may be configured to cause an image-capture device coupled to the computing device to capture an image or a video of the determined wearer-view.

In the example where the computing device includes the wearable computing device, the image or the video may be captured from a point-of-view (POV) of the wearable computing device by a forward-facing camera coupled to the wearable computing device. In one example, the forward-facing camera may be coupled to a head-mounted display (HMD) coupled to the wearable computing device. In this example, the image or the video captured by the forward-facing camera may provide an indication of what a user of the wearable computing device or the HMD may be looking at or tracking with the user's eyes.

FIG. 7 illustrates a user 702 wearing a wearable computing device 704. The wearable computing device 704 may be configured to receive gaze information indicative of a wearer-view associated with the wearable computing device 704. The gaze information, for example, may include an image or a video captured by an image-capture device coupled to the wearable computing device 704. As an example, the image-capture device may include the camera 120 in FIG. 1A, or the camera 206 in FIG. 2, or the camera 312 in FIG. 3 or any other image-capture device coupled to a respective wearable computing device.

Referring back to FIG. 6, at block 604, the method 600 includes determining, based on the gaze information, content depicted on a display device in the wearer-view. For example, in FIG. 7, based on the gaze information (e.g., the image or the video), the wearable computing device 704 may be configured to determine that the wearer-view includes content depicted on a display device in the wearer-view. The display device may include any type of display devices depending on an environment of the user 702. In FIG. 7, different types of display devices are illustrated including an advertisement screen 706, an overhead projector screen 708 having multiple content items 709A-C projected on the overhead projector screen 708, a terminal screen 710, a laptop 712 used by an operator 713, a personal digital assistant (PDA) 714, an appliance 716 including a display device 717, a personal computer 718, and a stack of screens (e.g., televisions) 720. These types are shown for illustration only. Other types of display devices with displayed content can be used. All or a subset of these display devices may exist at a given location where the user 702 may be.

The wearable computing device 704 may be configured to determine, based on the gaze information, the wearer-view (e.g., where the user 702 may be gazing at) and determine respective content displayed on a respective display device in the determined wearer-view.

In one example, the wearable computing device 704 may be configured use image recognition techniques known in the art to determine the respective content depicted on the respective display device. In another example, the wearable computing device 704 may be configured to communicate the gaze information and/or a visual search query associated with the respective content through a network (e.g., the internet) to a server. In this example, the server may be configured to receive the gaze information (e.g., the image or the video) and/or the visual search query and may be configured to determine the respective content.

The content may include, for example, a video, an interactive media element (e.g., a webpage or an animation), a game, an advertisement, a graphic user-interface (e.g., user-interface of a software for playing music), or any other type of content.

Referring back to FIG. 6, at block 606, the method 600 includes determining audio information relating to the content. For example, in FIG. 7, the wearable computing device 704, upon receiving the gaze information and determining the content, may be configured to determine audio information (e.g., audio stream) corresponding to the content displayed.

In another example, the server in communication with the wearable computing device 704, upon receiving the gaze information or the visual search query and determining the content, may be configured, through access or communication with a database, to determine the audio information corresponding to the content displayed. For example, if the content includes a game displayed on the laptop 712 in FIG. 7, the audio information may include voice commentary that explains the game or music that accompanies the game. In this example, the operator 713 may have a choice to register the laptop 712 to opt in or out to allow or prevent the user 702 from accessing the audio information.

In another example, the content may be programming instructions displayed on the appliance 716, and the audio information may include music or audio instructions that accompany the programming instructions. In still another example, the content may include a graphic user-interface of software application for playing music, and the audio information may include the music or a song playing at the display device in the wearer view. These examples are for illustrations only. Other examples of content displayed on a given display device having an accompanying audio are possible.

In addition, the computing device may be configured to determine other relevant audio information such as a timestamp indicative of a current time position in the content displayed and a time position of an accompanying audio stream corresponding to the current time position in the content, for example.

Referring back to FIG. 6, at block 608, the method 600 includes causing an audio stream associated with the audio information to be played at the computing device. As an example, one or more speakers (e.g., the speaker 123 illustrated in FIG. 1B) may be coupled to the computing device, and the computing device may be configured to cause the audio stream to be played through the speakers.

In FIG. 7, either the wearable computing device 704 or the server in communication with the wearable computing device 704 may be configured to cause the audio stream to be played at the wearable computing device 704. In one example, the wearable computing device 704 may be configured to receive an audio file or an audio stream from the server through the network and may be configured to cause a software application configured to play the audio file by executing instructions stored on a memory coupled to the wearable computing device 704, for example.

In an example, the audio stream may be synchronized to the content. For example, the computing device may be configured to cause the audio stream to be played starting at the time position (i.e., the time position determined, as part of the audio information, to correspond to the current time position in the content displayed) to be in synchrony with the content. In another example, the audio stream may not be synchronized to the content and may start playing at a beginning of the audio stream. In still another example, the audio stream determined and caused to be played by the computing device may be a portion of a longer audio stream.

To determine which display device or content is gazed at or focused on and cause a corresponding audio stream to be played, the computing device (i.e., either the wearable computing device 704 or the server in communication with the wearable computing device 704) may be configured to determine, based on the gaze information, a focus metric that may be a function of an amount of time during which the content is gaze at. The computing device may be configured to cause the audio stream to be played at the computing device based on a comparison of the focus metric to a predetermined focus threshold.

In an example, the computing device (i.e., either the wearable computing device 704 or the server in communication with the wearable computing device 704) may be configured to determine, based on the gaze information, a change in the wearer-view. For example, the gaze information may indicate that the user 702 disregarded (e.g., looked away from) a respective content displayed on a respective display device of the display devices 706, 708, 710, 712, 714, 716, 718, and 720. Accordingly, the computing device may be configured to stop playing the audio stream. Further, based on the gaze information, the computing device may be configured to determine that the user 702 re-focused on the respective content and, accordingly, may be configured to cause the audio stream to resume playing at the computing device. The audio stream may or may not be caused to resume playing in synchrony with the respective content.

In another example, the computing device may be configured to determine, based on the gaze information, a change in the wearer-view indicating that a first content on a first display device (e.g., the terminal screen 710) is disregarded and that a second content displayed on a second display device (e.g., the PDA 714) is focused on. Accordingly, the computing device may be configured to cause a first audio stream associated with the first content to stop playing and cause a second audio stream relating to the second content displayed on the second display device to be played.

In still another example, the wearer-view may include multiple display devices. In this example, the computing device may be configured to choose a respective display device and respective content on which the user 702 gazes the longest. In another example, the user 702 may walk into a room including multiple display devices and may scan around the room (e.g., through head motion) to capture the display devices within a number of wearer-views. In this example, the computing device may be configured to identify the display devices and provide a listing of the display devices to the user 702 and cause an audio stream to play based on receiving a selection of one of the display devices or respective display contents from the user 702.

In yet another example, the content may comprise multiple items displayed on the display device. For example, multiple content items including a video 709A, a graphic user-interface 709B, and a game 709C may be displayed on the overhead projector screen 708 (or any other display device). The computing device (i.e., either the wearable computing device 704 or the server in communication with the wearable computing device 704) may be configured to determine, based on the gaze information, that a first content item of the multiple items 709A-C is gaze at and cause an associated first audio stream to be played at the wearable computing device 704. Further, the computing device may be configured to determine, based on the gaze information, a change in the wearer-view indicating that the first content item is disregarded and that a second content item is gazed at. Accordingly, the computing device may be configured to cause a second audio stream associated with the second content item to be played at the computing device. Similarly, with respect to the stack of screens 720, the computing device may be configured to determine which screen of the stack of screens 720 is gazed at and cause an associated audio stream to be played at the wearable computing device 704.

In yet still another example, the computing device (i.e., either the wearable computing device 704 or the server in communication with the wearable computing device 704) may be configured to determine a type of a given display device (e.g., through image recognition, or manufacturer name on the device, etc.) to further help determine types of content that the given display device can display. For example, a television screen (e.g., of the stack of screens 720) may display a television series, movie or commercial but may not display a software application. However, content displayed on the PDA 714, for example, may include a software application.

In these examples, operators or owners of the display devices will have a choice to register the respective display device to opt in or out to allow or prevent the user 702 from accessing the audio information.

In the examples described above, the content is displayed on display devices away from the user 702. In an example, the wearable computing device 704 may be configured to generate a display of multiple content items on a head-mounted display (HMD) coupled to the wearable computing device 704. The wearable computing device 704 may be configured to receive gaze information from an eye-tracking system coupled to the wearable computing device 704 and determine which content item of the multiple content items is gazed at (e.g., through communication with the server). Further, the wearable computing device 704 may be configured to cause an associated audio stream to be played at the wearable computing device 704. The associated audio stream may or may not be synchronized to the content item. The computing device also may be configured to stop playing the associated audio stream upon receiving gaze information indicating that the user 702 may be gazing at another content item and may be configured to cause another audio stream corresponding to the other content item to be played instead.

Figure 8:
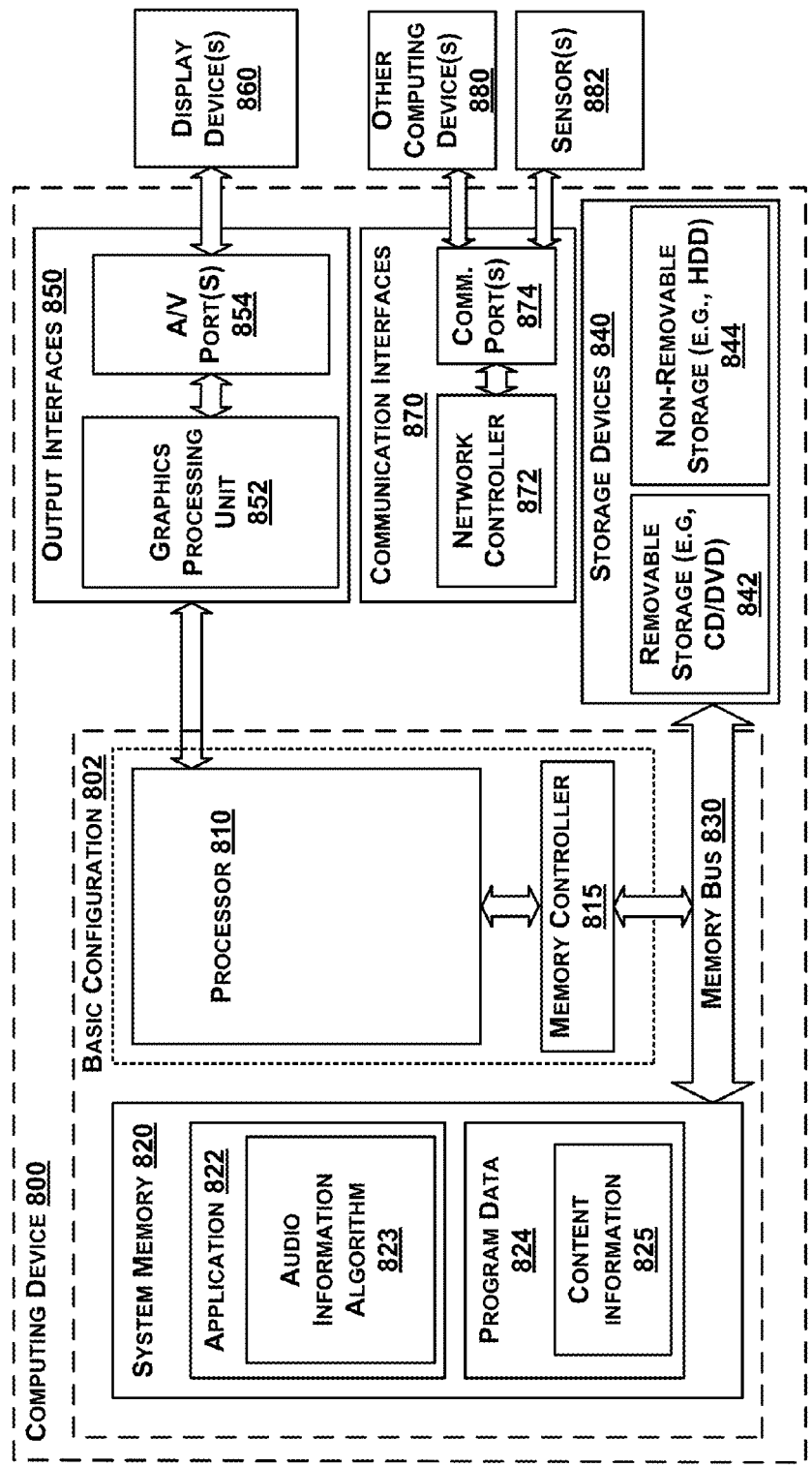
FIG. 8 is a functional block diagram illustrating an example computing device used in a computing system that is arranged in accordance with at least some embodiments described herein.

FIG. 8 is a functional block diagram illustrating an example computing device 800 used in a computing system that is arranged in accordance with at least some embodiments described herein. The computing device may be a personal computer, mobile device, cellular phone, video game system, or global positioning system, and may be implemented as a client device, a server, a system, a combination thereof, or may be part of the wearable computing systems or head-mounted devices shown in FIGS. 1-3. Alternatively, the computing device 800 may be communicatively coupled to the head-mounted devices via a wired or wireless connection.

In a basic configuration 802, computing device 800 may include one or more processors 810 and system memory 820. A memory bus 830 can be used for communicating between the processor 810 and the system memory 820. Depending on the desired configuration, processor 810 can be of any type including but not limited to a microprocessor (μP), a microcontroller (μC), a digital signal processor (DSP), or any combination thereof. A memory controller 815 can also be used with the processor 810, or in some implementations, the memory controller 815 can be an internal part of the processor 810.

Depending on the desired configuration, the system memory 820 can be of any type including but not limited to volatile memory (such as RAM), non-volatile memory (such as ROM, flash memory, etc.) or any combination thereof. System memory 820 may include one or more applications 822, and program data 824. Application 822 may include audio information algorithm 823 that is arranged to provide inputs to the electronic circuits, in accordance with the present disclosure. Program Data 824 may include content information 825 that could be directed to any number of types of data. In some examples, application 822 can be arranged to operate with program data 824 on an operating system.

Computing device 800 can have additional features or functionality, and additional interfaces to facilitate communications between the basic configuration 802 and any devices and interfaces. For example, data storage devices 840 can be provided including removable storage devices 842, non-removable storage devices 844, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 820 and storage devices 840 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 800. Any such computer storage media can be part of the computing device 800.

The computing device 800 can also include output interfaces 850 that may include a graphics processing unit 852, which can be configured to communicate to various external devices such as display devices 860 or speakers via one or more A/V ports 854 or a communication interface 870. The communication interface 870 may include a network controller 872, which can be arranged to facilitate communications with one or more other computing devices 880 and one or more sensors 882 over a network communication via one or more communication ports 874. The one or more sensors 882 are shown external to the computing device 800, but may also be internal to the device. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Figure 9:
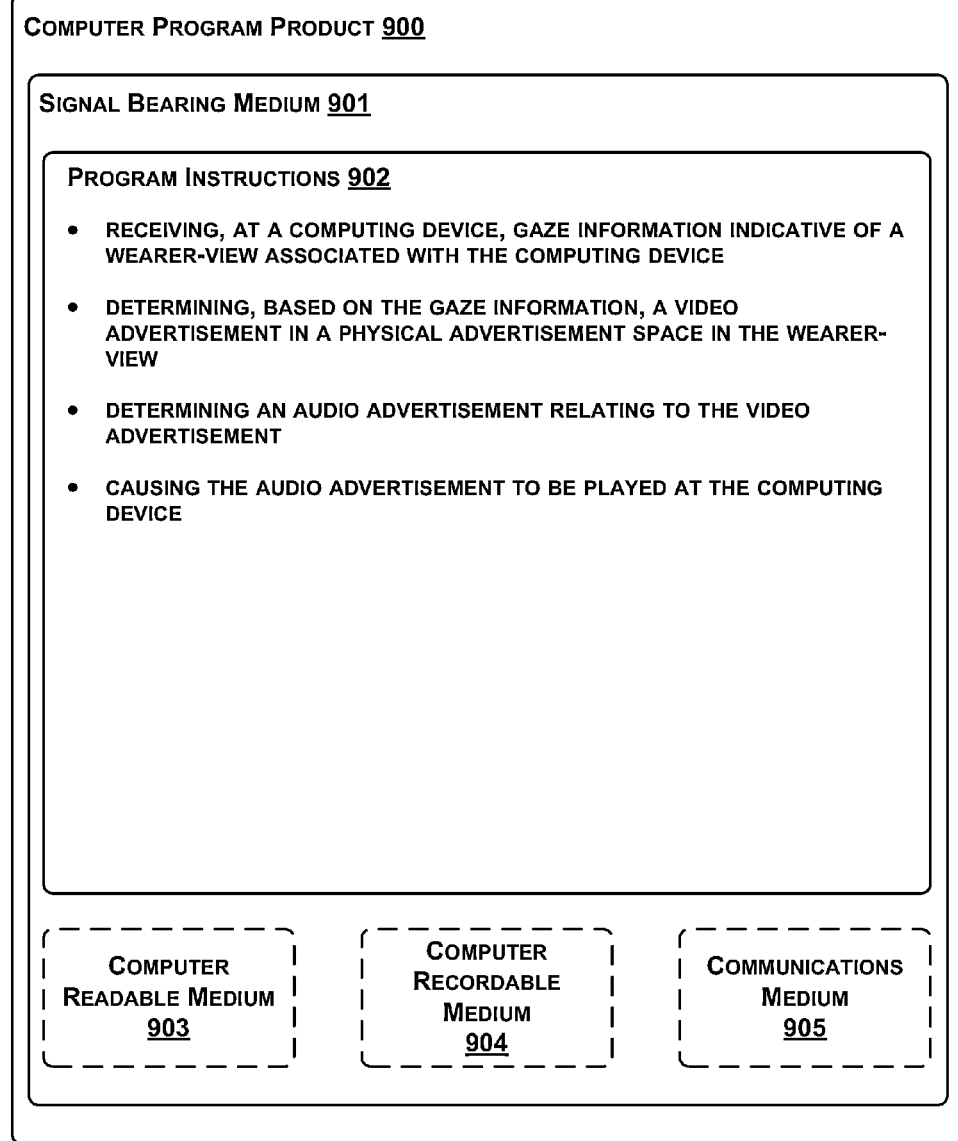
FIG. 9 is a schematic illustrating a conceptual partial view of an example computer program product that includes a computer program for executing a computer process on a computing device, arranged according to at least some embodiments presented herein.

In some embodiments, the disclosed methods may be implemented as computer program instructions encoded on a computer-readable storage media in a machine-readable format, or on other non-transitory media or articles of manufacture. FIG. 9 is a schematic illustrating a conceptual partial view of an example computer program product 900 that includes a computer program for executing a computer process on a computing device, arranged according to at least some embodiments presented herein. In one embodiment, the example computer program product 900 is provided using a signal bearing medium 901. The signal bearing medium 901 may include one or more program instructions 902 that, when executed by one or more processors may provide functionality or portions of the functionality described above with respect to FIGS. 1-8. Thus, for example, referring to the embodiments shown in FIGS. 4 and 6, one or more features of blocks 402-408 and blocks 602-608 may be undertaken by one or more instructions associated with the signal bearing medium 901. In addition, the program instructions 902 in FIG. 9 describe example instructions as well.

In some examples, the signal bearing medium 901 may encompass a computer-readable medium 903, such as, but not limited to, a hard disk drive, a Compact Disc (CD), a Digital Video Disk (DVD), a digital tape, memory, etc. In some implementations, the signal bearing medium 901 may encompass a computer recordable medium 904, such as, but not limited to, memory, read/write (R/W) CDs, R/W DVDs, etc. In some implementations, the signal bearing medium 901 may encompass a communications medium 905, such as, but not limited to, a digital and/or an analog communication medium (e.g., a fiber optic cable, a waveguide, a wired communications link, a wireless communication link, etc.). Thus, for example, the signal bearing medium 901 may be conveyed by a wireless form of the communications medium 905 (e.g., a wireless communications medium conforming to the IEEE 802.11 standard or other transmission protocol).

The one or more programming instructions 902 may be, for example, computer executable and/or logic implemented instructions. In some examples, a computing device such as the computing device 800 of FIG. 8 may be configured to provide various operations, functions, or actions in response to the programming instructions 902 conveyed to the computing device 800 by one or more of the computer readable medium 903, the computer recordable medium 904, and/or the communications medium 905. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method, comprising:

receiving, at a wearable computing device, gaze information comprising: (i) an image or a video indicative of a wearer-view through a field of view of the wearable computing device, and (ii) data indicating a view direction associated with the wearer-view;

identifying a video advertisement that is playing, in a physical advertisement space captured in the image or the video, at a location in the image or the video that corresponds to the view direction, wherein identifying the video advertisement comprises:

generating a search query based on (i) a portion of the image or the video at the location that corresponds to the view direction, and (ii) an amount of time during which the location in the image or the video corresponds to the view direction, providing the search query to a server, and receiving an identification of the video advertisement;

in response to identifying the video advertisement that is playing in the physical advertisement space that corresponds to the view direction, determining an audio advertisement relating to the video advertisement; and causing the audio advertisement to be played at the wearable computing device.

2. The method of claim 1, wherein causing the audio advertisement to be played at the wearable computing device comprises causing the audio advertisement to be played at the wearable computing device in response to determining that the amount of time exceeds a predetermined threshold time period.

3. The method of claim 1, further comprising:
determining, based on the gaze information, a change in the view direction, wherein the change is indicative that the video advertisement is disregarded;
causing the audio advertisement to stop playing; and
causing the audio advertisement to resume playing in response to determining that the view direction has changed back to correspond to the location at which video advertisement is playing.

4. The method of claim 1, wherein receiving the gaze information comprises receiving information relating to a gaze axis from an eye-tracking system coupled to the wearable computing device, wherein the data indicating the view direction is based on the gaze axis.

5. The method of claim 4, further comprising determining the wearer-view based on the gaze axis.

6. The method of claim 1, wherein the audio advertisement is synchronized to the video advertisement playing in the physical advertisement space.

7. A system, comprising:
an eye-tracking system;
a camera coupled to a head-mounted display (HMD), wherein the camera is configured to capture a field of view of the HMD; and
a computing device in communication with the eye-tracking system and the camera, wherein the computing device is configured to:
receive, from the eye-tracking system, gaze information comprising: (i) an image or a video indicative of a wearer-view through a field of view of the wearable computing device, and (ii) data indicating a view direction associated with the wearer-view;
identify an animated content that is playing, on a display device captured in the image or the video, at a location in the image or the video that corresponds to the view direction, wherein, to identify the animated content, the computing device is configured to:
generate a search query based on (i) a portion of the image or the video at the location that corresponds to the view direction, and (ii) an amount of time during which the location in the image or the video corresponds to the view direction,
provide the search query to a server, and
receive an identification of the animated content;
in response to identifying the animated content that is playing on the display device that corresponds to the view direction, determine audio information relating to the animated content; and
cause an audio stream associated with the audio information to be played at the computing device.

8. The system of claim 7, wherein the computing device is further configured to:
determine, based on the gaze information, a change in the view direction, wherein the change is indicative of the animated content playing on the display device being disregarded; and
cause the audio stream to stop playing.

9. The system of claim 8, wherein the computing device is further configured to cause the audio stream to resume playing in response to determining that the view direction has changed back to correspond to the location at which the animated content is playing.

10. The system of claim 7, wherein the eye-tracking system comprises a given camera, wherein the gaze information comprises one or more images captured by the given camera, and wherein the computing device is further configured to:
determine a gaze axis based on the one or more images; and
determine the view direction based on the determined gaze axis.

11. The system of claim 10, wherein the image or the video are captured for the determined wearer-view.

12. The system of claim 7, wherein the audio stream is synchronized to the animated content.

13. The system of claim 7, wherein the animated content comprises multiple items displayed on the display device, and wherein the computing device is further configured to:
identify, based on the gaze information, a respective item of the multiple items; and
cause a respective audio stream relating to the respective item to be played at the computing device.

14. The system of claim 13, wherein the computing device is further configured to:
determine, based on the gaze information, a change in the view direction, wherein the change is indicative that the respective item is disregarded;
cause the respective audio stream item to stop playing;
identify, based on the gaze information, a given item gazed at in the changed view direction; and
cause a given audio stream relating to the given item to be played at the computing device.

15. The system of claim 7, wherein the computing device is further configured to:
determine, based on the gaze information, a change in the view direction, wherein the change is indicative that the animated content on the display device is disregarded;
cause the audio stream to stop playing;
identify, based on the gaze information, a respective content depicted on a respective display device in the changed view direction; and
cause a respective audio stream to be played at the computing device.

16. The system of claim 7, wherein the animated content comprises one or more of a video, an interactive media element, a game, an advertisement, and a graphical user-interface.

17. A non-transitory computer readable medium having stored thereon instructions executable by a wearable computing device to cause the wearable computing device to perform functions comprising:
receiving gaze information comprising: (i) an image or a video indicative of a wearer-view through a field of view of the wearable computing device, and (ii) data indicating a view direction associated with the wearer-view;
identifying a video advertisement that is playing, in a physical advertisement space captured in the image or the video, at a location in the image or the video that corresponds to the view direction, wherein identifying the video advertisement comprises:
generating a search query based on (i) a portion of the image or the video at the location that corresponds to the view direction, and (ii) an amount of time during which the location in the image or the video corresponds to the view direction,
providing the search query to a server, and receiving an identification of the video advertisement;

in response to identifying the video advertisement that is playing in the physical advertisement space that corresponds to the view direction, determining an audio advertisement relating to the video advertisement; and causing the audio advertisement to be played at the wearable computing device.

18. The non-transitory computer readable medium of claim 17, wherein the instructions are further executable by the wearable computing device to cause the wearable computing device to perform functions comprising:

determining, based on the gaze information, a focus metric, wherein the focus metric is based on the amount of time during which the location in the image or the video corresponds to the view direction; and causing the audio advertisement to be played at the wearable computing device based on a comparison of the focus metric to a predetermined focus threshold.

* * * * *